(12) United States Patent
Turetzky et al.

(10) Patent No.: US 7,949,362 B2
(45) Date of Patent: May 24, 2011

(54) SATELLITE POSITIONING AIDED COMMUNICATION SYSTEM SELECTION

(75) Inventors: Gregory Turetzky, San Jose, CA (US); Erik Anderson, San Francisco, CA (US)

(73) Assignee: Sirf Technology, Inc., San Jose, CA (US)

( * ) Notice: Subject to any disclaimer, the term of this patent is extended or adjusted under 35 U.S.C. 154(b) by 1374 days.

(21) Appl. No.: 11/022,294

(22) Filed: Dec. 22, 2004

(65) Prior Publication Data

US 2005/0153730 A1   Jul. 14, 2005

Related U.S. Application Data

(63) Continuation-in-part of application No. 10/885,507, filed on Jul. 3, 2004, which is a continuation-in-part of application No. PCT/US03/16308, filed on May 22, 2003, which is a continuation of application No. 10/155,614, filed on May 22, 2002, now Pat. No. 6,684,158, which is a continuation-in-part of application No. 09/795,871, filed on Feb. 28, 2001, now Pat. No. 6,427,120, said application No. 10/855,507 is a continuation-in-part of application No. 10/385,198, filed on Mar. 10, 2003, now Pat. No. 6,915,208, which is a continuation of application No. 10/127,229, filed on Apr. 19, 2002, now Pat. No. 6,542,823, which is a continuation of application No. 09/795,871, filed on Feb. 28, 2001, now Pat. No. 6,427,120, said application No. 10/885,507 is a continuation-in-part of application No. 10/194,627, filed on Jul. 12, 2002, now Pat. No. 7,577,448, which is a continuation of application No. 10/068,751, filed on Feb. 5, 2002, now Pat. No. 6,519,466, which is a continuation of application No. 09/781,068, filed on Feb. 8, 2001, now Pat. No. 6,389,291, said application No. 10/885,587 is a continuation-in-part of application No. 10/700,821, filed on Nov. 4, 2003, now Pat. No. 7,263,440, which is a continuation-in-part of application No. 09/575,492, filed on May 18, 2000, now Pat. No. 6,671,620.

(60) Provisional application No. 60/225,076, filed on Aug. 14, 2000.

(51) Int. Cl.
*H04M 1/00* (2006.01)

(52) U.S. Cl. .................. 455/552.1; 455/550.1; 455/3.02; 455/150.1

(58) Field of Classification Search ............... 455/550.1, 455/130, 12.1, 456.1, 457, 426.1, 435.1, 455/67.1, 404, 521, 259, 575.7, 192.2, 75, 455/182.2, 150.1, 161.1, 151.3, 67.13, 552.1, 455/553, 127.4, 186.1
See application file for complete search history.

(56) References Cited

U.S. PATENT DOCUMENTS 4,287,599 A * 9/1981 Goncharoff et al. ............ 455/77
(Continued)

FOREIGN PATENT DOCUMENTS

EP 0511741 11/1992
(Continued)

OTHER PUBLICATIONS

Soliman et al., gps One: A hybrid position location system, 2000 IEEE, pp. 334-335.
(Continued)

*Primary Examiner* — Tan Trinh
(74) *Attorney, Agent, or Firm* — Pillsbury Winthrop Shaw Pittman LLP

(57) ABSTRACT

A software communication device with a tunable transceiver that is capable of receipt of both satellite positioning data and a communication network with a wireless network where positioning data is used to efficiently make a connection to the communication network or communication link to a network is used to reduce the time to acquire GPS satellites and determine position.

25 Claims, 7 Drawing Sheets

U.S. PATENT DOCUMENTS

| | | | |
|---|---|---|---|
| 4,426,712 A | 1/1984 | Gorski-Popiel | |
| 4,445,118 A | 4/1984 | Taylor et al. | |
| 4,463,357 A | 7/1984 | MacDoran | |
| 4,578,678 A | 3/1986 | Hurd | |
| 4,667,203 A | 5/1987 | Counselman, III | |
| 4,701,934 A | 10/1987 | Jasper | |
| 4,754,465 A | 6/1988 | Trimble | |
| 4,785,463 A | 11/1988 | Janc et al. | |
| 4,809,005 A | 2/1989 | Counselman, III | |
| 4,821,294 A | 4/1989 | Thomas, Jr. | |
| 4,890,233 A | 12/1989 | Ando et al. | |
| 4,894,662 A | 1/1990 | Counselman | |
| 4,998,111 A | 3/1991 | Ma et al. | |
| 5,014,066 A | 5/1991 | Counselman, III | |
| 5,036,329 A | 7/1991 | Ando | |
| 5,043,736 A | 8/1991 | Darnell et al. | |
| 5,108,334 A | 4/1992 | Eschenbach et al. | |
| 5,177,490 A | 1/1993 | Ando et al. | |
| 5,202,829 A | 4/1993 | Geier | |
| 5,223,844 A | 6/1993 | Mansell et al. | |
| 5,225,842 A | 7/1993 | Brown et al. | |
| 5,257,195 A | 10/1993 | Hirata | |
| 5,293,170 A | 3/1994 | Lorenz et al. | |
| 5,311,195 A | 5/1994 | Mathis et al. | |
| 5,323,164 A | 6/1994 | Endo | |
| 5,343,209 A | 8/1994 | Sennott et al. | |
| 5,345,244 A | 9/1994 | Gildea et al. | |
| 5,347,284 A | 9/1994 | Volpi et al. | |
| 5,347,536 A | 9/1994 | Meehan | |
| 5,365,450 A | 11/1994 | Schuchman et al. | |
| 5,379,224 A | 1/1995 | Brown et al. | |
| 5,402,347 A | 3/1995 | McBurney et al. | |
| 5,402,441 A | 3/1995 | Washizu et al. | |
| 5,416,712 A | 5/1995 | Geier et al. | |
| 5,420,593 A | 5/1995 | Niles | |
| 5,422,813 A | 6/1995 | Schuchman et al. | |
| 5,440,313 A | 8/1995 | Osterdock et al. | |
| 5,450,344 A | 9/1995 | Woo et al. | |
| 5,504,684 A | 4/1996 | Lau et al. | |
| 5,506,587 A | 4/1996 | Lans | |
| 5,535,278 A | 7/1996 | Cahn et al. | |
| 5,546,445 A * | 8/1996 | Dennison et al. | 455/408 |
| 5,587,715 A | 12/1996 | Lewis | |
| 5,592,173 A | 1/1997 | Lau et al. | |
| 5,594,425 A * | 1/1997 | Ladner et al. | 340/825.49 |
| 5,625,668 A | 4/1997 | Loomis et al. | |
| 5,663,734 A | 9/1997 | Krasner | |
| 5,663,735 A | 9/1997 | Eshenbach | |
| 5,666,330 A | 9/1997 | Zampetti | |
| 5,701,328 A | 12/1997 | Schuchman et al. | |
| 5,724,660 A * | 3/1998 | Kauser et al. | 455/456.2 |
| 5,726,893 A | 3/1998 | Schuchman et al. | |
| 5,739,786 A | 4/1998 | Greenspan et al. | |
| 5,757,786 A | 5/1998 | Joo | |
| 5,764,184 A | 6/1998 | Hatch et al. | |
| 5,781,156 A | 7/1998 | Krasner | |
| 5,786,789 A | 7/1998 | Janky | |
| 5,812,087 A | 9/1998 | Krasner | |
| 5,825,327 A | 10/1998 | Krasner | |
| 5,828,694 A | 10/1998 | Schipper | |
| 5,831,574 A | 11/1998 | Krasner | |
| 5,841,396 A | 11/1998 | Krasner | |
| 5,845,203 A | 12/1998 | LaDue | |
| 5,854,605 A | 12/1998 | Gildea | |
| 5,874,914 A | 2/1999 | Krasner | |
| 5,877,724 A | 3/1999 | Davis | |
| 5,877,725 A | 3/1999 | Kalafus | |
| 5,883,594 A | 3/1999 | Lau | |
| 5,884,214 A | 3/1999 | Krasner | |
| 5,889,474 A | 3/1999 | LaDue | |
| 5,903,654 A | 5/1999 | Milton et al. | |
| 5,907,578 A | 5/1999 | Pon et al. | |
| 5,907,809 A | 5/1999 | Molnar et al. | |
| 5,917,444 A | 6/1999 | Loomis et al. | |
| 5,920,283 A | 7/1999 | Shaheen et al. | |
| 5,923,703 A | 7/1999 | Pon et al. | |
| 5,926,131 A | 7/1999 | Sakumoto et al. | |
| 5,936,572 A | 8/1999 | Loomis et al. | |
| 5,940,027 A | 8/1999 | Forseth et al. | |
| 5,943,363 A | 8/1999 | Hanson et al. | |
| 5,945,944 A | 8/1999 | Krasner | |
| 5,963,582 A | 10/1999 | Stansell, Jr. | |
| 5,963,851 A * | 10/1999 | Blanco et al. | 455/75 |
| 5,966,403 A | 10/1999 | Pon | |
| 5,977,909 A | 11/1999 | Harrison et al. | |
| 5,982,324 A | 11/1999 | Watters et al. | |
| 5,987,016 A | 11/1999 | He | |
| 5,999,124 A | 12/1999 | Sheynblat | |
| 6,002,362 A | 12/1999 | Gudat | |
| 6,002,363 A | 12/1999 | Krasner | |
| 6,009,551 A | 12/1999 | Sheynblat | |
| 6,016,119 A | 1/2000 | Krasner | |
| 6,040,798 A | 3/2000 | Kinal et al. | |
| 6,041,222 A | 3/2000 | Horton et al. | |
| 6,047,017 A | 4/2000 | Cahn et al. | |
| 6,052,081 A | 4/2000 | Krasner | |
| 6,061,018 A | 5/2000 | Sheynblat | |
| 6,064,336 A | 5/2000 | Krasner | |
| 6,081,229 A | 6/2000 | Soliman et al. | |
| 6,085,090 A | 7/2000 | Yee et al. | |
| 6,097,974 A | 8/2000 | Camp, Jr. et al. | |
| 6,104,338 A | 8/2000 | Krasner | |
| 6,104,340 A | 8/2000 | Krasner | |
| 6,104,712 A | 8/2000 | Robert et al. | |
| 6,107,960 A | 8/2000 | Krasner | |
| 6,111,540 A | 8/2000 | Krasner | |
| 6,111,541 A | 8/2000 | Karmel | |
| 6,122,506 A | 9/2000 | Lu et al. | |
| 6,131,067 A | 10/2000 | Girerd et al. | |
| 6,133,871 A | 10/2000 | Krasner | |
| 6,133,873 A | 10/2000 | Krasner | |
| 6,133,874 A | 10/2000 | Krasner | |
| 6,150,980 A | 11/2000 | Krasner | |
| 6,172,640 B1 | 1/2001 | Durst et al. | |
| 6,178,195 B1 | 1/2001 | Durboraw et al. | |
| 6,185,427 B1 | 2/2001 | Krasner et al. | |
| 6,188,351 B1 | 2/2001 | Bloebaum | |
| 6,211,817 B1 | 4/2001 | Eschenbach | |
| 6,211,819 B1 | 4/2001 | King et al. | |
| 6,222,483 B1 * | 4/2001 | Twitchell et al. | 342/357.09 |
| 6,222,484 B1 | 4/2001 | Seiple et al. | |
| 6,225,944 B1 | 5/2001 | Hayes | |
| 6,236,354 B1 | 5/2001 | Krasner | |
| 6,236,365 B1 | 5/2001 | LeBlanc et al. | |
| 6,249,245 B1 | 6/2001 | Watters et al. | |
| 6,252,543 B1 | 6/2001 | Camp et al. | |
| 6,263,280 B1 | 7/2001 | Stingone, Jr. | |
| 6,272,430 B1 | 8/2001 | Krasner | |
| 6,295,024 B1 | 9/2001 | King et al. | |
| 6,313,786 B1 | 11/2001 | Sheynblat et al. | |
| 6,327,473 B1 | 12/2001 | Soliman et al. | |
| 6,343,290 B1 * | 1/2002 | Cossins et al. | 707/10 |
| 6,347,228 B1 | 2/2002 | Ludden et al. | |
| 6,353,412 B1 | 3/2002 | Soliman | |
| 6,389,291 B1 | 5/2002 | Pande et al. | |
| 6,400,314 B1 | 6/2002 | Krasner | |
| 6,405,132 B1 | 6/2002 | Breed et al. | |
| 6,411,811 B2 | 6/2002 | Kingdon et al. | |
| 6,414,987 B1 | 7/2002 | Pon | |
| 6,427,120 B1 | 7/2002 | Garin et al. | |
| 6,429,809 B1 | 8/2002 | Vayanos et al. | |
| 6,429,815 B1 | 8/2002 | Soliman | |
| 6,433,733 B2 * | 8/2002 | Syrjarinne et al. | 342/357.08 |
| 6,433,739 B1 | 8/2002 | Soliman | |
| 6,453,237 B1 | 9/2002 | Fuchs et al. | |
| 6,456,234 B1 | 9/2002 | Johnson | |
| 6,462,708 B1 | 10/2002 | Tsujimoto et al. | |
| 6,466,612 B2 | 10/2002 | Kohli et al. | |
| 6,473,030 B1 | 10/2002 | McBurney et al. | |
| 6,477,363 B1 * | 11/2002 | Ayoub et al. | 455/404.2 |
| 6,480,145 B1 | 11/2002 | Hasegawa | |
| 6,501,420 B2 * | 12/2002 | Townsend et al. | 342/357.1 |
| 6,505,161 B1 | 1/2003 | Brems | |
| 6,519,466 B2 | 2/2003 | Pande et al. | |
| 6,526,283 B1 * | 2/2003 | Jang | 455/456.5 |
| 6,526,352 B1 | 2/2003 | Breed et al. | |
| 6,529,829 B2 | 3/2003 | Turetzky et al. | |

| | | |
|---|---|---|
| 6,535,815 B2 | 3/2003 | Bloebaum |
| 6,542,823 B2 | 4/2003 | Garin et al. |
| 6,546,232 B1 * | 4/2003 | Sack et al. ............... 455/90.1 |
| 6,559,793 B1 | 5/2003 | Eschenbach |
| 6,570,530 B2 | 5/2003 | Gaal et al. |
| 6,583,734 B2 | 6/2003 | Bates et al. |
| 6,633,255 B2 | 10/2003 | Krasner |
| 6,650,694 B1 | 11/2003 | Brown et al. |
| 6,677,894 B2 | 1/2004 | Sheynblat et al. |
| 6,684,158 B1 | 1/2004 | Gariu et al. |
| 6,707,423 B2 | 3/2004 | Turetzky et al. |
| 6,720,920 B2 | 4/2004 | Breed et al. |
| 6,731,238 B2 | 5/2004 | Johnson |
| 6,738,630 B2 | 5/2004 | Ashmore |
| 6,748,198 B1 * | 6/2004 | Salo ............... 455/150.1 |
| 6,748,217 B1 | 6/2004 | Hunzinger et al. |
| 6,771,625 B1 * | 8/2004 | Beal ............... 370/336 |
| 6,829,534 B2 | 12/2004 | Fuchs et al. |
| 6,871,061 B1 * | 3/2005 | Koorapaty et al. ........ 455/404.2 |
| 6,873,288 B2 | 3/2005 | Heppe |
| 7,010,270 B1 * | 3/2006 | Thomas et al. ............ 455/67.13 |
| 7,091,904 B2 | 8/2006 | Vantalon et al. |
| 7,107,064 B2 * | 9/2006 | Ito ............... 455/456.1 |
| 2001/0012771 A1 * | 8/2001 | Ruiz ............... 455/259 |
| 2002/0064209 A1 | 5/2002 | Turetzky et al. |
| 2002/0072854 A1 | 6/2002 | Fuchs et al. |
| 2002/0080063 A1 | 6/2002 | Bloebaum et al. |
| 2002/0082774 A1 | 6/2002 | Bloebaum |
| 2002/0107030 A1 * | 8/2002 | Syrjarinne ............... 455/456 |
| 2002/0115436 A1 * | 8/2002 | Howell et al. ............... 455/426 |
| 2002/0142783 A1 | 10/2002 | Yoldi et al. |
| 2002/0145560 A1 | 10/2002 | Tsujimoto et al. |
| 2002/0186165 A1 | 12/2002 | Eschenbach |
| 2003/0016170 A1 | 1/2003 | Jandrell |
| 2003/0104818 A1 | 6/2003 | Kotziu |
| 2003/0112176 A1 | 6/2003 | Vayanos et al. |
| 2003/0112178 A1 | 6/2003 | Bajikar |
| 2003/0125044 A1 | 7/2003 | Deloach et al. |
| 2003/0176204 A1 | 9/2003 | Abraham |
| 2003/0212487 A1 | 11/2003 | Dooley et al. |
| 2004/0130484 A1 | 7/2004 | Krasner |
| 2004/0162084 A1 | 8/2004 | Wang |
| 2004/0179483 A1 * | 9/2004 | Perlow et al. ............... 370/278 |
| 2004/0179589 A1 * | 9/2004 | Yousef et al. ............... 375/233 |
| 2004/0254717 A1 * | 12/2004 | Sugahara et al. ............. 701/200 |
| 2004/0263386 A1 | 12/2004 | King et al. |
| 2005/0186968 A1 * | 8/2005 | Durst et al. ............... 455/456.1 |
| 2006/0038719 A1 | 2/2006 | Pande et al. |
| 2006/0181452 A1 | 8/2006 | King et al. |
| 2007/0063875 A1 | 3/2007 | Hoffberg |
| 2008/0005275 A1 | 1/2008 | Overton et al. |
| 2008/0055154 A1 | 3/2008 | Martucci et al. |
| 2008/0167049 A1 | 7/2008 | Karr et al. |

FOREIGN PATENT DOCUMENTS

| | | |
|---|---|---|
| EP | 1 092 987 | 4/2001 |
| EP | 1 427 236 A | 6/2004 |
| EP | 1 452 886 A | 9/2004 |
| GB | 2115195 | 1/1983 |
| GB | 2 335 554 A | 3/1998 |
| JP | 58-105632 | 6/1983 |
| JP | 7-36035 | 5/1986 |
| JP | 4-326079 | 11/1992 |
| JP | 2000-102058 | 4/2000 |
| WO | WO 90/11652 | 10/1990 |
| WO | WO 99/47943 | 9/1999 |
| WO | WO 00/10031 | 2/2000 |
| WO | WO 00/45191 | 8/2000 |
| WO | WO 01/62034 A | 8/2001 |
| WO | WO 02/04975 | 1/2002 |
| WO | WO 03/098248 | 11/2003 |
| WO | WO2006014170 | 2/2006 |

OTHER PUBLICATIONS

Van Nee, D.J.R., Coenen, A.J.R., New Fast GPS Code-Acquisition Using FFT, Electronic Letters, vol. 27, No. 2, pp. 148-160, Published Jan. 17, 1991.

Coenen, A.J.R., Van Nee, D.J.R., Novel Fast GPS/GLONASS Code Acquisition Technique Using Low Update Rate FFT, Electronic Letters, vol. 28, No. 9, pp. 863-865, Published Apr. 23, 1992.

International Search Report Issued for PCT/US2005/044458, dated Sep. 14, 2006.

* cited by examiner

|  | Shared | Comm. | GPS | Initializer |
|---|---|---|---|---|
| I/O | Receive/ Transmit Data Buffers 402 | | | |
| Program | Low-Level Math, Common Signal Processing 404 | High-Level Comm. 406 | High-Level GPS 408 | Logic to Initialize Comm. from GPS and GPS from Comm. 410 |
| Database | | | | Geographic Network Database 412 |

SATELLITE POSITIONING AIDED COMMUNICATION SYSTEM SELECTION

RELATED APPLICATIONS

This application is a continuation-in-part ("C-I-P") of and claims priority to U.S. patent application Ser. No. 10/885,507, entitled "Aided Location Communication System," by A. Pande, Lionel J. Garin, K. Chadha, L. Peng, G. Zhang, N. Vantalon and Gregory B. Turetzky, filed Jul. 3, 2004 which is a C-I-P of PCT Patent Application PCT/US03/16308 entitled "Search Domain Reducing Frequency Transfer in a Multi-mode GPS Used with Wireless Networks," by A. Pande, Lionel J. Garin, K. Chadha, L. Peng, G. Zhang, N. Vantalon, and Gregory B. Turetzky, filed May 22, 2003 and published Dec. 14, 2003, which is a continuation of C-I-P U.S. patent application Ser. No. 10/155,614, entitled "Search Domain Reducing Frequency Transfer in a Multi-mode GPS Used with Wireless Networks," by L. Garin, L. Peng, G. Zhang and N. Vantalon, filed May 22, 2002 and issued as U.S. Pat. No. 6,684,158 on Jan. 27, 2004, which is a Continuation-In-Part of U.S. patent application Ser. No. 09/795,871 entitled "Information Transfer in a Multi-mode GPS Used with Wireless Networks," by Ashutosh Pande, Lionel J. Garin, Kanwar Chadha and Gregory B. Turetzky, filed Feb. 28, 2001 and issued on Jul. 30, 2002 as U.S. Pat. No. 6,427,120, all of which are incorporated by reference.

Additionally, said U.S. patent application Ser. No. 09/795,871 claims priority to U.S. Provisional Patent Application Ser. No. 60/225,076, entitled "Multi-Mode Global Positioning System for Use with Wireless Networks," by Ashutosh Panda, Lionel J. Garin, Kanwar Chandra, and Gregory B. Turetzky, filed Aug. 14, 2000.

Additionally, said U.S. patent application Ser. No. 10/885,507 is a C-I-P of Continuation U.S. patent application Ser. No. 10/385,198, entitled "Information Transfer in a Multi-Mode GPS Used with Wireless Networks," by A. Panda, L. Garin, K. Chadha, and G. Turetzky, filed Mar. 10, 2003, and issued as U.S. Pat. No. 6,915,208 on Jul. 5, 2005, which is a continuation of Continuation U.S. patent application Ser. No. 10/127,229, entitled "Information Transfer in a Multi-Mode GPS Used with Wireless Networks," by A. Pande, L. Garin, K. Chadha, and G. Turetzky, filed Apr. 19, 2002 and issued as U.S. Pat. No. 6,542,823 on Apr. 1, 2003, which is a continuation of U.S. patent application Ser. No. 09/795,871, entitled "Information Transfer in a Multi-Mode GPS Used with Wireless Networks," by Ashutosh Pande, Lionel J. Garin, Kanwar Chadha, and Gregory B. Turetzky, filed Feb. 28, 2001, and issued on Jul. 30, 2002 as U.S. Pat. No. 6,427,120, which claims priority to U.S. Provisional Patent Application Ser. No. 60/225,076, entitled "Multi-Mode Global Positioning System for Use with Wireless Networks," filed Aug. 14, 2000.

Moreover, U.S. patent application Ser. No. 10/885,507 is a C-I-P of Continuation application Ser. No. 10/194,627, entitled "Multi-Mode GPS For Use with Wireless Networks," by A. Pande, L. Garin, K. Chadha, and G. Turetzky, filed Jul. 12, 2002, now U.S. Pat. No. 7,577,448 which is a continuation of Continuation U.S. patent application Ser. No. 10/068,751, entitled "Multi-Mode Global Positioning System For Use with Wireless Networks," by A. Pande, L. Garin, K. Chadha, and G. Turetzky, filed Feb. 5, 2002 and issued as U.S. Pat. No. 6,519,466 on Feb. 11, 2003, which is a continuation of U.S. patent application Ser. No. 09/781,068, entitled "Multi-Mode Global Positioning System for Use with Wireless Networks," by A. Pande, L. Garin, K. Chadha, and G. Turetzky, filed Feb. 8, 2001 and issued as U.S. Pat. No. 6,389,291 on May 14, 2002, which claims priority to U.S. Provisional Patent Application Ser. No. 60/225,076. entitled "Multi-Mode Global Positioning System for Use with Wireless Networks," filed Aug. 14, 2000.

Furthermore, U.S. patent application Ser. No. 10/885,507 is a C-I-P of C-I-P U.S. patent application Ser. No. 10/700,821, entitled "Satellite Based Positioning Method and System for Coarse Location Positioning," by L. Garin and K. Schmidt, filed Nov. 4, 2003 and issued as U.S. Pat. No. 7,263,440 on Aug. 28, 2007, which is a C-I-P of U.S. patent application Ser. No. 09/575,492, entitled "Method and Apparatus for Determining Global Position Using Almanac Information," by L. Garin and K. Schmidt, filed May 18, 2000 and issued as U.S. Pat. No. 6,671,620 on Dec. 20, 2003.

BACKGROUND OF THE INVENTION

1. Field of the Invention

This invention relates generally to mobile communication systems and in particular to combined Satellite Positioning Systems (SATPS) and communication systems.

2. Related Art

A Satellite Positioning System (SATPS) such as the Global Positioning System (GPS) maintained by the United States Government is based on radio navigation. The GPS system is a satellite based navigation system having a network of 24 satellites, plus on orbit spares, orbiting 11,000 nautical miles above the Earth, in six evenly distributed orbits. Each GPS satellite orbits the Earth every twelve hours.

A prime function of the GPS satellites is to serve as a clock. Each GPS satellite derives its signals from an on board 10.23 MHz Cesium atomic clock. Each GPS satellite transmits a spread spectrum signal with its own individual pseudo noise (PN) code. By transmitting several signals over the same spectrum using distinctly different PN coding sequences the GPS satellites may share the same bandwidth without interfering with each other. The code used in the GPS system is 1023 bits long and is sent at a rate of 1.023 megabits per second, yielding a time mark, sometimes called a "chip" approximately once every micro-second. The sequence repeats once every millisecond and is called the coarse acquisition code (C/A code). Every 20th cycle the code can change phase and is used to encode a 1500 bit long message, which contains "almanac" data for the other GPS satellites.

There are 32 PN codes designated by the GPS authority. Twenty-four of the PN codes belong to current GPS satellites in orbit and the 25th PN code is designated as not being assigned to any GPS satellite. The remaining PN codes are spare codes that may be used in new GPS satellites to replace old or failing units. A GPS receiver may, using the different PN sequences, search the signal spectrum looking for a match. If the GPS receiver finds a match, then it has identified the GPS satellite, which generated that signal.

Ground based GPS receivers use a variant of radio range measurement methodology, called trilateration, in order to determine the position of the ground based GPS receiver. The GPS position determination is different from the radio direction finding (RDF) technology of the past in that the radio beacons are no longer stationary; they are satellites moving through space at a speed of about 1.8 miles per second as they orbit the earth. By being space based, the GPS system can be used to establish the position of virtually any point on Earth using methods such as trilateration.

The trilateration method depends on the GPS receiving unit obtaining a time signal from the GPS satellites. By knowing the actual time and comparing it to the time that is received from the GPS satellites, the receiver can calculate the distance to the GPS satellite. If, for example, the GPS satellite is 12,000 miles from the receiver, then the receiver must be located somewhere on the location sphere defined by the radius of 12,000 miles from that GPS satellite. If the GPS receiver then ascertains the position of a second GPS satellite it can calculate the receiver's location based on a location sphere around the second GPS satellite. The two spheres intersect and form a circle with the GPS receiver being located somewhere within that location circle. By ascertaining the distance to a third GPS satellite the GPS receiver can project a location sphere around the third GPS satellite. The third GPS satellite's location sphere will then intersect the location circle produced by the intersection of the location spheres of the first two GPS satellites at just two points. By determining the location sphere of one more GPS satellite, whose location sphere will intersect one of the two possible location points, the precise position of the GPS receiver is determined to be the location point located on the Earth. The fourth GPS satellite is also used to resolve the clock error in the receiver. As a consequence, the exact time may also be determined, because there is only one time offset that can account for the positions of all the GPS satellites. The trilateration method may yield positional accuracy on the order of 30 meters; however the accuracy of GPS position determination may be degraded due to signal strength and multipath reflections.

As many as 11 GPS satellites may be received by a GPS receiver at one time. In certain environments such as a canyon, some GPS satellites may be blocked out, and the GPS position determining system may depend for position information on GPS satellites that have weaker signal strengths, such as GPS satellites near the horizon. In other cases overhead foliage may reduce the signal strength that is received by the GPS receiver unit. In either case the signal strength may be reduced or totally blocked. In such case, aiding information may be used to aid in location determination.

There are multiple ways of using radio spectrum to communicate. For example in frequency division multiple access (FDMA) systems, the frequency band is divided into a series of frequency slots and different transmitters are allotted different frequency slots. In time division multiple access (TDMA) systems, the time that each transmitter may broadcast is limited to a time slot, such that transmitters transmit their messages one after another, only transmitting during their allotted period. With TDMA, the frequency upon which each transmitter transmits may be a constant frequency or may be continuously changing (frequency hopping).

The GPS system currently employs spread spectrum technology to convey its data to ground units. The use of spread spectrum is especially advantageous in satellite positioning systems. Spread spectrum technology enables GPS receiver units to operate on a single frequency, thus saving the additional electronics that would be needed to switch and tune other bands if multiple frequencies were used. Spread Spectrum also minimizes power consumption requirements of GPS receivers. GPS transmitters for example require 50 watts or less and tolerate substantial interference.

Recently mobile communication devices such as cellular telephones have been incorporating GPS receiver technology using multiple dedicated semiconductor chips to implement a communication portion and other dedicated semiconductor chips to implement a GPS portion of the mobile communication device. Mobile communication device often are capable of using one of multiple communication systems that employ different standards, such as Motorola's StarTac that may communicate over a Amps analog cellular system, CDMA digital cellular system, or a GSM digital cellular system. Currently mobile communication devices determine how to search between the multiple communication systems using brute-force algorithms. Often these algorithms require significant power and are often less then efficient.

Therefore, there is a need for methods and systems for improving the ability of communication devices to quickly and efficiently locate a communication system that may be employed for communication.

SUMMARY

Approaches consistent with the present invention provide a communication device with the ability to use position information to more efficiently access the communication network and/or the ability of a GPS portion of a communication device to more efficiently acquire a GPS signal. By combining the position of the communication device with a geographic database of communication network boundaries and specific elements, the mobile device can restrict its search to network standards and frequencies that correspond to its local position. The communication device may also save time and energy by knowing in advance not to attempt interaction with networks where access is known to be restricted. Such communication device may have generic hardware implementing generic hardware portions of RF receivers along with software to implement a communication function and a GPS function. Such receivers determine if a communication device, such as a cellular telephone may access a communication network. This approach uses positioning data with geographic information associated with the communication network to search only the cell site frequencies and communication networks that are in proximity to the communication device. In another approach, the communication network provides aiding information to the GPS function that decreases the time to determine the location of the communication device. The communication device may be equipped with a GPS receiver or receive positioning information from other device via another network.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 4 is a memory division diagram of controller functions of FIG. 2.

DETAILED DESCRIPTION

Figure 1:
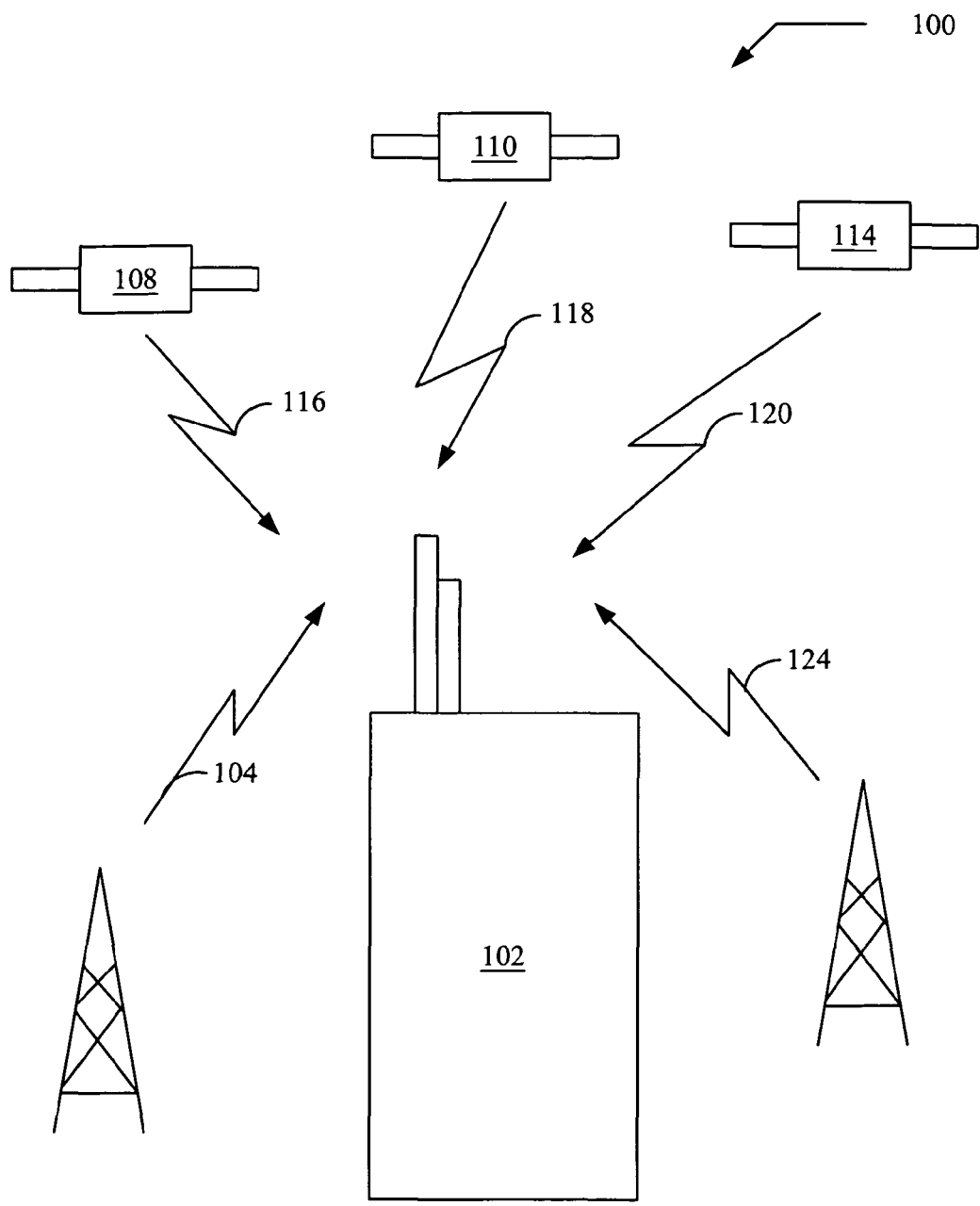
FIG. 1 illustrates a mobile station having a software implemented satellite-positioning receiver capable of communication with multiple communication networks.

Unlike the known approaches previously discussed, a Mobile Station is able to use satellite positioning data along with digital geographic data associated with different communication networks to aid or assist in efficiently and rapidly acquire a communication system or to use a communication system to rapidly acquire GPS satellites. Turning first to FIG. 1, a Mobile Station 102 having a software implemented satellite-positioning receiver capable of communication with multiple communication networks 104 and 106 is illustrated 100. The software implemented satellite-positioning receiver may be a set of programmable hardware and shared memory, such a software configurable digital signal processor connected to a memory. A preprogrammed set of instructions may be executed that configure the programmable hardware and shared memory as the communication function and/or GPS function, such as a software defined radio and a GPS function to implement Mobile Station 102.

A plurality of satellites 108, 110 and 114 orbit the Earth in a constellation. An example of such a satellite constellation is the global positioning system (GPS) operated by the United States Government. The satellites 108, 110 and 112 transmit positioning signals 116, 118 and 120 that may be received at a GPS enabled device such as Mobile Station 102. The Mobile Station 102 may also communicate with different wireless networks, such as example 104 and 106. Examples of a Mobile Station may include; a cellular telephones, a personal digital assistant (PDA), a pager, a computer, or other portable digital devices. Each communication network may communicate with the Mobile Station 102 using unique signals 122 and 124. Examples of unique signals used by different communication networks are different types of cellular network communication standards (GSM, TDMA, 800 MHz AMPS, 800 MHz NAMPS, TACS, 800 MHz, 1900 MHz CDMA).

Figure 2:
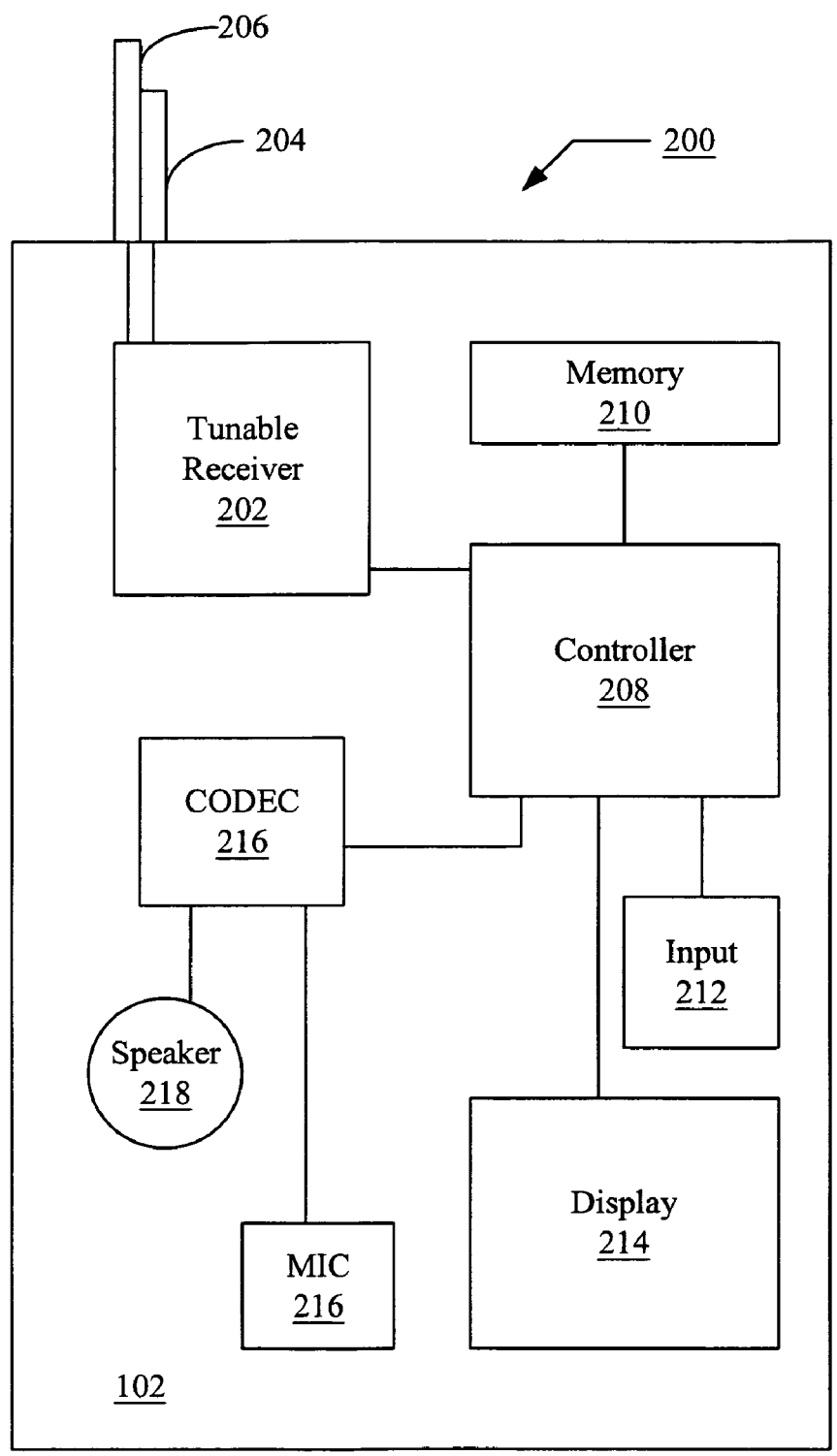
FIG. 2 is a block diagram of the Mobile Station of FIG. 1.

In FIG. 2, a block diagram 200 of the Mobile Station 102 of FIG. 1 is shown. The Mobile Station 102 has a tunable transceiver 202 coupled to a GPS antenna 204 and a wireless network antenna 206. In other embodiments, a single antenna implementation may be employed that is tuned between the GPS positioning signals and communication network signals.

The tunable receiver 202 may also be coupled to a controller 208. The controller 208 may be coupled to the tunable receiver 202, memory 210, input device 212, display 214, codec 216. The codec 216 may be coupled to the controller 208, speaker 218, and microphone 220. The GPS signal is received via GPS antenna 204 at the tunable transceiver 202 that is tuned to receive the GPS signal. The controller 208 receives and processes the raw GPS positioning data and the location of the Mobile Station 102 is determined. In an alternate embodiment, the location of the Mobile Station 102 may be preloaded by the user, or received via a network such as Bluetooth or 802.11 network from a GPS server or even another wireless device. In other embodiments, communication and GPS signals may be switched between two separate receivers or transceivers with the received signals being processed by a common controller, such as a microprocessor.

The controller 208 may be configurable via software to have a communication function and a GPS function. The software contained in memory 210 may be accessed during initialization to start the Mobile Station 102 as a communication device executing the communication function or as a GPS receiver executing the GPS function. In yet another embodiment, the hardware may be configured so both the communication function and GPS function are executed at the same time with multiplexing or sharing of other common hardware, such as areas of memory 210 and the tunable receiver 202. The controller 208 may also configure the tunable receiver 202 to receive data from the communication system or the GPS system.

The controller 208 using the determined location, may access digital geographic data contained in memory 210. The digital geographic data in memory 210 may have communication network information associated with different geographic positions. The communication network information accessed by the controller 208 may then be used to select a communication network which to tune the tunable transceiver 202. Once tuned to a selected communication network, the controller 208 may activate a graphical symbol on the display 214 that indicates a link with the communication network.

Once a connection is established with the communication network, then calls may be placed with audio data being coded and decoded via a codec 216. Audio signals are received at a microphone 220 and digitally encoded by the codec 216 for communication over the communication network. The controller 208 passes digital communication signals received at the tunable transceiver 202 to the codec 216 where they are decoded from digital signals into audio signals. The audio signals are then passed to the speaker 218. In other embodiments, it may be possible that the positioning link established in the communication network is a communication link, such as a link established using the 802.11 or UWB standard.

Figure 3:
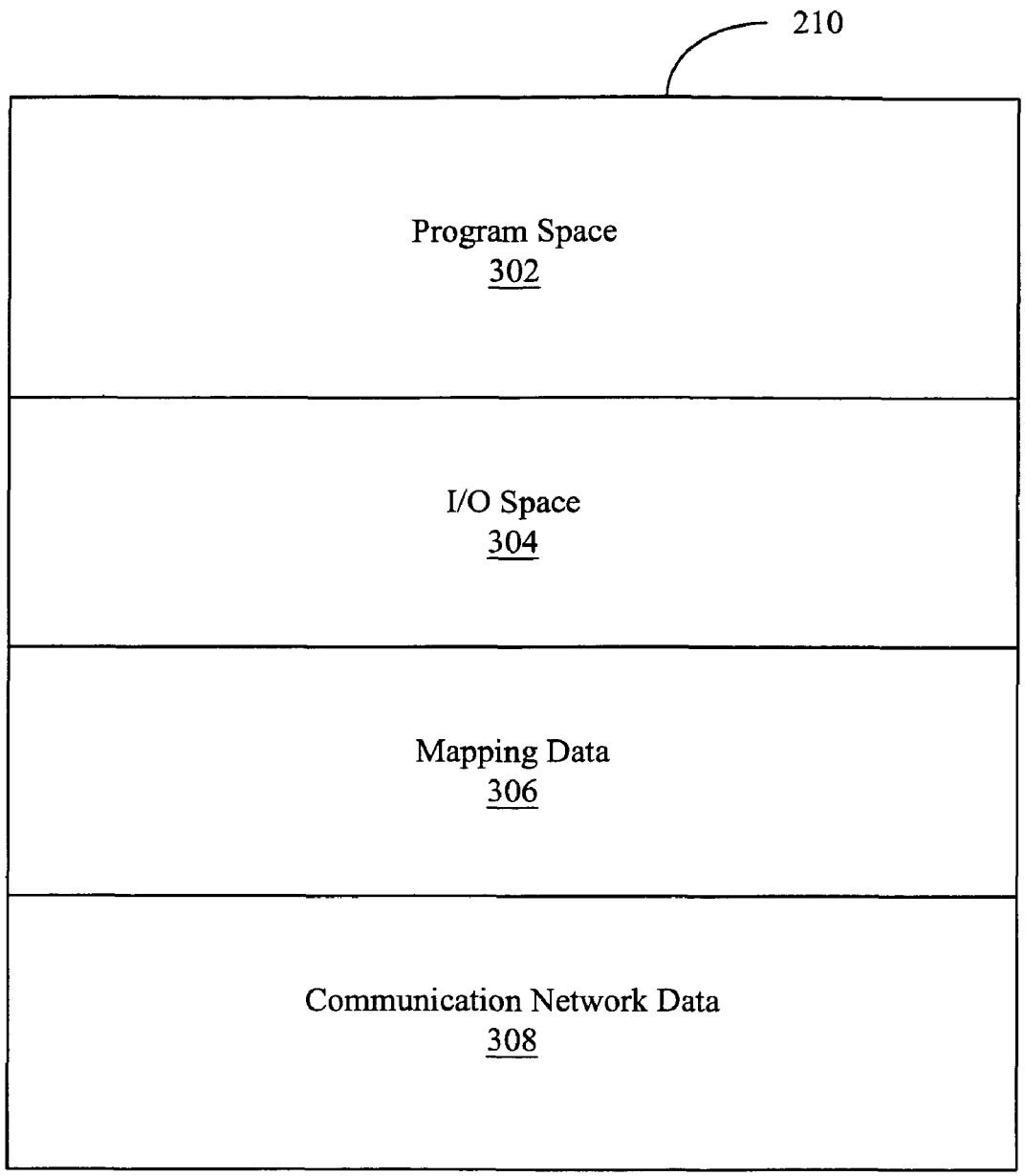
FIG. 3 is a memory diagram of the memory of the Mobile Station of FIG. 2.

Turning to FIG. 3, a memory diagram of the memory 210 of Mobile Station 102 of FIG. 2 is shown. The memory 210 may be random access memory (RAM), read only memory (ROM), electronically programmable memory (EPROM, EEPROM), or a combination of digital memory. The memory may also be optical memory such as found in compact disk (CDs) or similar memory readable using laser light.

The memory 210 may have an area for storing software referred to as program space 302 that controls the operation of the Mobile Station 102. Another area of memory 210 may be used for data input and data output buffering referred to as I/O space 304. Digital geographic data may be stored in a mapping data 306 locations in memory 210. Another area of memory 210 may be reserved for communication network data 308 that associates cell site information with the digital geographic data. The digital geographic data may be downloaded over a network into the memory or contained in a removable memory chip, such as used by GPS chart plotters.

In FIG. 4, a diagram 400 of the system memory 210 a division of the memory of Mobile Station 102 is shown. The diagram 400 is in the form of a matrix with subprograms used by the different functions (communication, GPS, Shared, and initializer) listed along the axes. Cell 402 indicates that Input/Output (I/O) area in memory may be shared between the communication function, GPS function, and the initializer function. The Input/Output (I/O) area is typically used to store captured raw data and may be implemented as a receive/transmit data buffer. This data may have had a carrier signal that is removed prior to the data being processed in the digital domain. The data may be at an intermediate frequency of a few MHz rather than the typical carrier frequency in the GHz range. If the GPS function and communication function are not processing signals at the same time, the I/O memory may also be used as a buffer that is shared between the different functions. The memory is further partitioned into program space with low-level processing programs such as low-level math processing for algorithm processing and common signal processing 404 that may be once again shared between communication functions, GPS functions and the initializer.

Communication software may have an area of memory where the software is loaded and located for use by the communication function and the GPS functions as shown by block 406. Examples of such software may include pre-processing of the data contained in the memory. Both the communication function and the GPS functions perform many similar tasks. For example, both radios may need to perform additional processing on the captured digital signals before they perform correlation. This additional processing may require additional modulation, application of IIR or FIR filtering, narrow-band noise analysis using frequency domain methods. The low-level mathematical functions to perform these tasks are the same in either the communication function or the GPS function of a software defined communication device enabling the software in the memory to be shared. Further, both the communication function and the GPS function may perform detection by correlating incoming data against reference symbols and may also share low-level functions for these operations can be shared by both the communication function and the GPS function.

Similarly, the GPS function may have a dedicated area of memory 408 for GPS specific software that enable location determination upon acquisition of location messages from satellites or aiding messages for other networks. Another area of memory shown by cell 410 may be dedicated for initialization of the other functions and configuring the memory. The memory may be random access type memory or read only permanent memory (including electronic programmable memory and smart cards). Examples of the type of software stored in this memory may include logic to initialize the configurable hardware for implementing the communication function, logic to initialize the configurable hardware for implementing the GPS function, initialize communication between the GPS function and the communication function.

The memory may also have an area for databases 412 that contain geographic information such as cellular cell locations. The databases may be fixed at the time of manufacturing of the Mobile Station 102 or may receive initial data and periodic updates via the network or via a user interface such as a serial bus connection on a personal computer, Bluetooth connection, or similar point-to-point or point-to-multipoint communication approaches.

Figure 5:
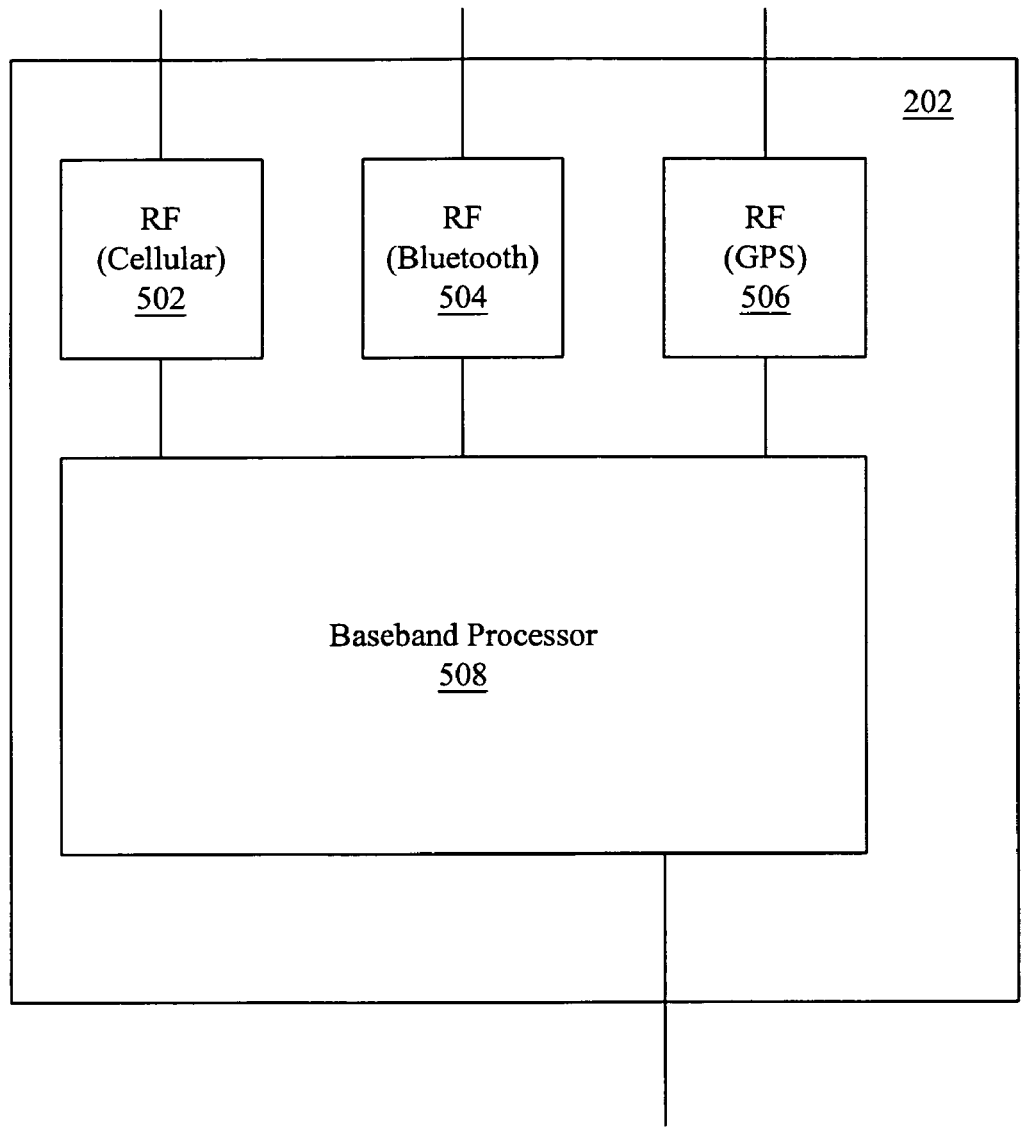
FIG. 5 is a block diagram of a configurable baseband processor with a number of RF chips.

Now turning to FIG. 5, a block diagram of a basband process coupled to a number of RF chips in the tunable receiver 202 is shown. Processing of digital signals typically occur in a two parts. The first part is the RF processing that removes the signal from a RF carrier. RF processing may occur within a dedicated chip, often referred to as a RF chip. The RF chips 502, 504 and 506 may be connected to individual antennas or may jointly share antennas depending on the implementation. The RF chips 502, 504 and 506 are also coupled to a baseband processor 508 that processes the digital signals once the RF carrier has been removed. A resource and savings is achieved by having a baseband processor 508 that is configurable by a controller to function with different RF chips. In other implementations, RF chips such as RF chips for GPS, BlueTooth, cellular, Ethernet, and WiFi may interface with a configurable baseband processor.

Figure 6:
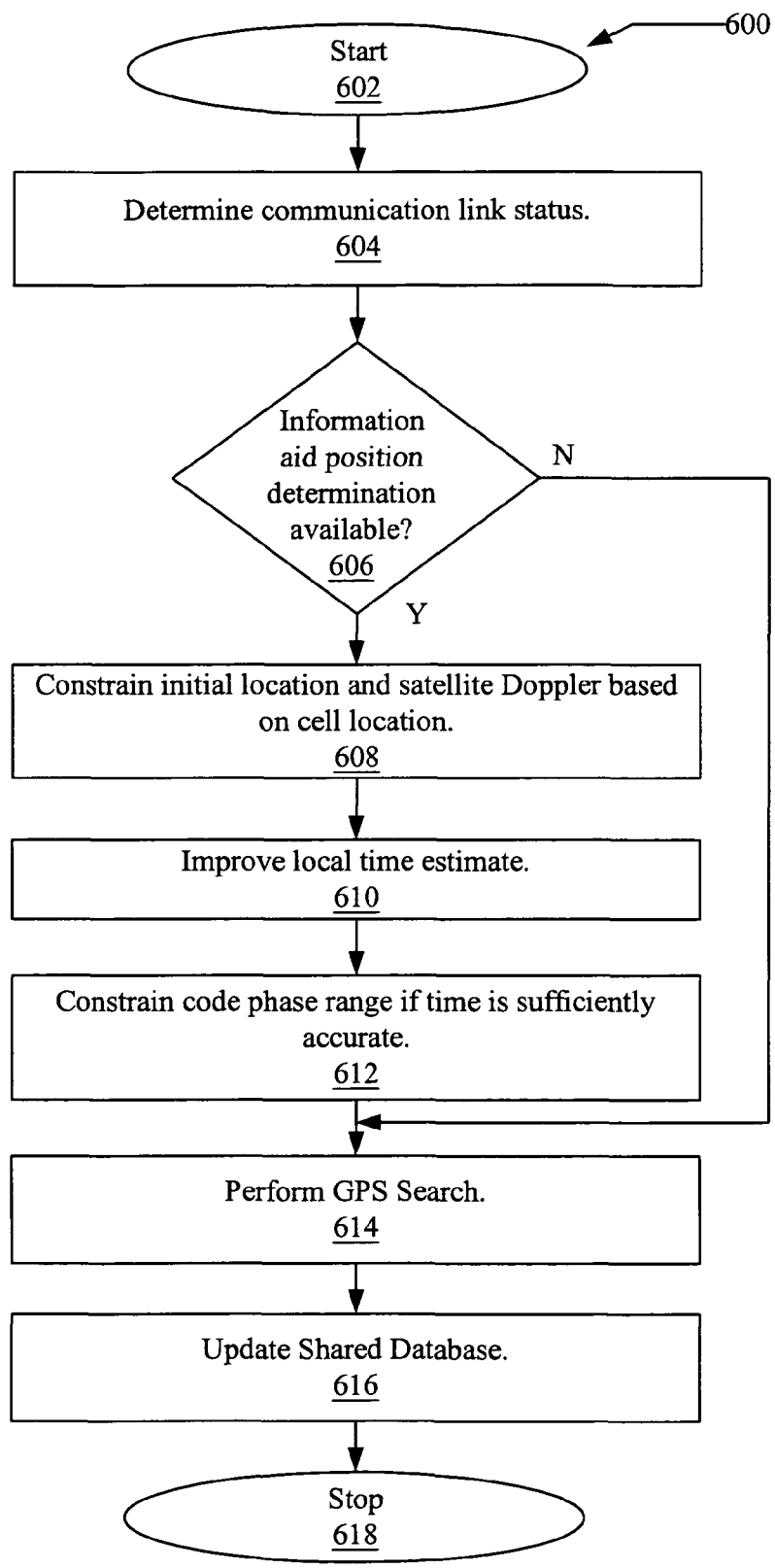
FIG. 6 illustrates a flow diagram of an approach of position determination executed by the Mobile Station of FIG. 2.

In FIG. 6, a flow diagram 600 of an approach of position determination executed by the Mobile Station of FIG. 2 is illustrated. The flow diagram starts 602 with a determination of the communication link status 604. In a cellular communication network, the communication function of the communication device may search for a communication link that is provided by one or more base stations. Once the communication link is identified, communication between the Mobile Station 102 and the network (switch and or server) may occur. The network may provide useful information to aid in rapid position determination 606. Examples of the useful information may include the location of the base station, sometime referred to as a cell tower. Other useful information may also include accurate time that may or may not be synchronized with the GPS network.

If useful information is available 606, then the position determination is constrained to an initial location and satellite Doppler based on the location of the base station 608. The local time estimate may also be updated using the received accurate time 610. A code phase range may then be constructed, provided the time is sufficiently accurate 612. A GPS search is then preformed using the constrained code phase range if available in 614. If useful information is not available 606 than a traditional GPS search is performed 614 without using additional aiding or assisting information. Upon position determination by the GPS function in the communication device, the memory may be updated 616 with almanac data, ephemeris data, and/or the location of the Mobile Station 102.

In FIG. 6, a flow diagram 600 of an approach network access executed by the Mobile Station 102 of FIG. 2 that determines which communication network to access. The flow diagram starts 602 with the tunable transceiver 202, being tuned to receive GPS signals. The GPS signals are received and the position of the Mobile Station is determined 604. The controller 208 than access the digital geographic database 606 using the determined GPS. Search the database for communication network data associated with the digital geographic data 608. If communication network data is available 610, then the controller than accesses the communication network data associated with the geographic database in order to identify what network and frequencies to initially attempt to access in order to setup a communication link 712. The controller 208 than makes a determination if a communication network is available to be accessed by the mobile station 102 in step 712. If communication network is available 208, than the controller configures the tunable transceiver for the closest network to be accessed 712. In the case of a cellular network, it would be the frequencies associated with the closet base site.

If the closest communication network is not reachable (i.e. a link can not be established) 714, then a check is made to determine if there are any other communication networks or cell sites within the communication network are within range 716. If there are other networks or cell cites are within range, than the next closest is identified 712 and the controller 208 tunes the transceiver 202 to those frequencies 716. If a link with communication network is established 714, then processing is complete 720.

If communication is determined not to be available in either steps 712 or 718, then the transceiver is not tuned an may be placed in a sleep mode to conserve power 722. A timer may be set for the period of sleep 724 and then the GPS position may be determined again 704. The sleep period may only be with respect to the communication network, while the transceiver is awake at predetermined periods to receive and process location information.

Figure 7:
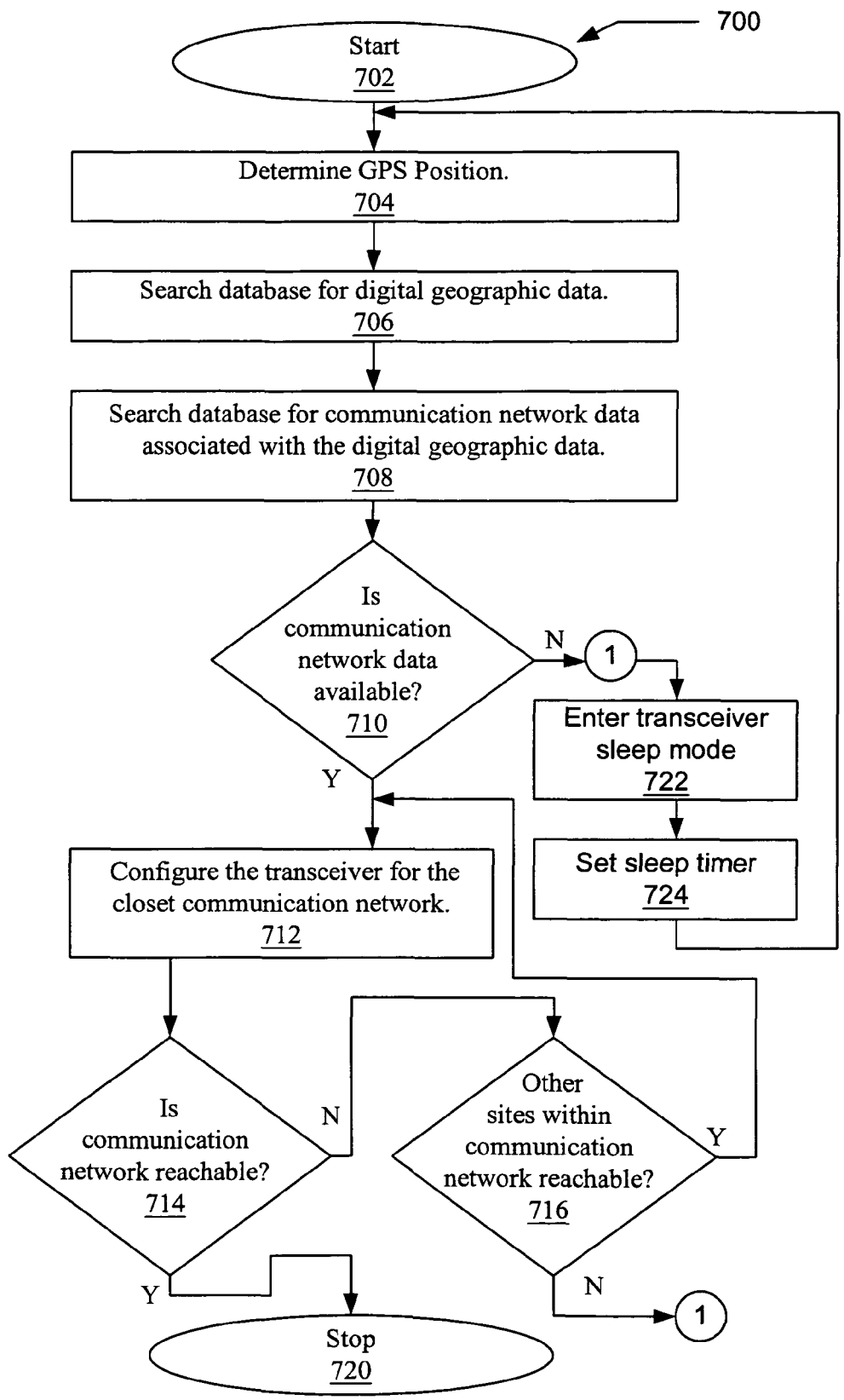
FIG. 7 illustrates a flow diagram of the Mobile Station of FIG. 2 using geographic information to select and access a communication network.

Parts of the flow diagram of FIG. 6 and FIG. 7 may be implemented in hardware, software, or a combination of hardware and software. Aspects of the present invention may be implemented as instructions in memory, one skilled in the art will appreciate that all or part of systems and methods consistent with the present invention may be stored on or read from other machine-readable media, for example, secondary storage devices such as hard disks, floppy disks, and CD- ROMs; a signal received from a network; or other forms of ROM or RAM either currently known or later developed.

In the current embodiment, the Mobile Station 102 has been described as a common set of hardware that is configurable by software to function as a software defined radio having both a communication function and a GPS function. In an alternate embodiment, the Mobile Station 102 may be communication device having dedicated hardware to implement the communication function and other hardware for implementing the GPS function. In yet other implementations, different degrees of hardware reuse may be achieved. In other implementations, the approaches to improving connection time and time required to make a position determination discussed above may be implemented on any time of communication device having some type of GPS function and access directly or indirectly to a geographical database.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A device, comprising:
   receiver that is tunable between receipt of positioning signals and a communication network signal;
   a memory with geographic data that is associated with at least one communication network; and
   a controller coupled to the receiver in receipt of positioning data from the receiver when the receiver is in receipt of positioning signals where the memory is accessed by the controller to search for the at least one communication network using the positioning data and to thereby retrieve parameters to access the at least one communication network.

2. The device of claim 1, where the geographic data is received at the receiver and stored in the memory by the controller.

3. The device of claim 1, where the controller is configurable by software function as a satellite positioning device that processes the positioning signals and a communication device that process the communication network signal.

4. The device of claim 1, includes a common antenna coupled to the receiver.

5. The device of claim 1, where the receiver is a transceiver.

6. The device of claim 1, includes:
   a timer that is configurable for a predetermined period of time set by the controller when the at least one communication network is unreachable by the device.

7. The device of clam 1, where the geographic data has cell site information.

8. The device of claim 7, where the geographic data further includes:
   a plurality of frequencies associated with a cell site.

9. The device of claim 1, where the receiver further includes:
   a first RF chip is associated with the positioning signals;
   a second RF chip is associated with the communication network signal; and
   a baseband processor configurable for receipt of the positioning signals from the first RF chip and then the communication network signal from the second RF chip.

10. A method of communication, comprising:
    tuning a receiver between receipt of a positioning signals and a communication network signal;
    storing in a memory geographic data that is associated with at least one communication network; and
    processing at a controller coupled to the receiver, positioning data from the receiver when the receiver is in receipt of positioning signals where the memory is accessed to retrieve the parameters to access the at least one communication network.

11. The method of claim 10, including:
    receiving geographic data at the receiver; and
    storing the geographic data in the memory by the controller.

12. The method of claim 10, further comprising:
    configuring the controller with software to function as a satellite positioning device that processes the positioning signals and a communication device that process the communication network signal.

13. The method of claim 10, includes a common antenna coupled to the receiver.

14. The method of claim 10, where the receiver is a transceiver.

15. The method of claim 10, includes:
    setting a timer for a predetermined period of time when the at least one communication network is unreachable by the device.

16. The method of claim 10, where the geographic data has cell site information.

17. The method of claim 16, where the geographic data further includes:
    a plurality of frequencies associated with a cell site.

18. The device of claim 10, where tuning further includes:
    receiving at a first RF chip is associated with the positioning signals;
    receiving at a second RF chip is associated with the communication network signal; and
    configuring a baseband processor configurable for receipt of the positioning signals from the first RF chip and then the communication network signal from the second RF chip.

19. A computer-readable media with machine readable instructions for controlling a communication device, comprising:
    a first set of machine readable instructions for tuning a receiver between receipt of positioning signals and a communication network signal;
    a second set of machine readable instructions for storing in a memory geographic data that is associated with at least one communication network; and
    a third set of machine readable instructions for processing, at a controller coupled to the receiver, positioning data from the receiver when the receiver is in receipt of positioning signals where the memory is accessed by the controller to search for the at least one communication network using the positioning data and to thereby retrieve parameters to access the at least one communication network.

20. The computer-readable media of claim 19, including:
    a fourth set of machine readable instructions for receiving geographic data at the receiver; and
    a fifth set of machine readable instructions for storing the geographic data in the memory by the controller.

21. The computer-readable media of claim 19, further comprising:
a fourth set of machine readable instructions for configuring the controller with software to function as a satellite positioning device that processes the positioning signals and a communication device that process the communication network signal.

22. The computer-readable media of claim 19, where the receiver is a transceiver that is tuned by the first set of machine readable instructions.

23. The computer-readable medium of claim 19, includes:
a fourth set of machine readable instructions for setting a timer for a predetermined period of time when the at least one communication network is unreachable by the device.

24. The computer-readable media of clam 19, where the geographic data has cell site information.

25. The media of claim 24, where the geographic data further includes:
a plurality of frequencies associated with a cell site.

* * * * *

UNITED STATES PATENT AND TRADEMARK OFFICE
CERTIFICATE OF CORRECTION

PATENT NO. : 7,949,362 B2
APPLICATION NO. : 11/022294
DATED : May 24, 2011
INVENTOR(S) : Turetzky et al.

Page 1 of 2

It is certified that error appears in the above-identified patent and that said Letters Patent is hereby corrected as shown below:

In the Specifications

In Column 1, Lines 9-10, delete "N. Vantalon" and insert -- N. Vantalon, --, therefor.

In Column 1, Line 16, delete "Dec. 14, 2003, which is a continuation of" and insert -- Dec. 4, 2003, which claims priority to --, therefor.

In Column 1, Line 19, delete "G. Zhang" and insert -- G. Zhang, --, therefor.

In Column 1, Lines 21-22, delete "which is a Continuation-In-Part of" and insert -- which claims priority to --, therefor.

In Column 1, Lines 24-25, delete "Kanwar Chadha" and insert -- Kanwar Chadha, --, therefor.

In Column 1, Lines 31-32, delete "Ashutosh Panda," and insert -- Ashutosh Pande, --, therefor.

In Column 1, Line 32, delete "Kanwar Chandra," and insert -- Kanwar Chadha, --, therefor.

In Column 1, Line 37, delete "A. Panda," and insert -- A. Pande, --, therefor.

In Column 2, Line 1, delete "60/225,076." and insert -- 60/225,076, --, therefor.

In Column 7, Line 43, delete "basband" and insert -- baseband --, therefor.

In Column 8, Line 47, delete "cell cites" and insert -- cell sites --, therefor.

In Column 8, Line 53, delete "an" and insert -- and --, therefor.

Signed and Sealed this
Sixteenth Day of April, 2013

Teresa Stanek Rea
*Acting Director of the United States Patent and Trademark Office*

CERTIFICATE OF CORRECTION (continued)
U.S. Pat. No. 7,949,362 B2

In the Claims:

In Column 9, Line 55, in Claim 7, delete "clam" and insert -- claim --, therefor.

In Column 10, Line 35, in Claim 18, delete "device" and insert -- method --, therefor.

In Column 12, Line 1, in Claim 23, delete "medium" and insert -- media --, therefor.

In Column 12, Line 6, in Claim 24, delete "clam" and insert -- claim --, therefor.